Figure 1:
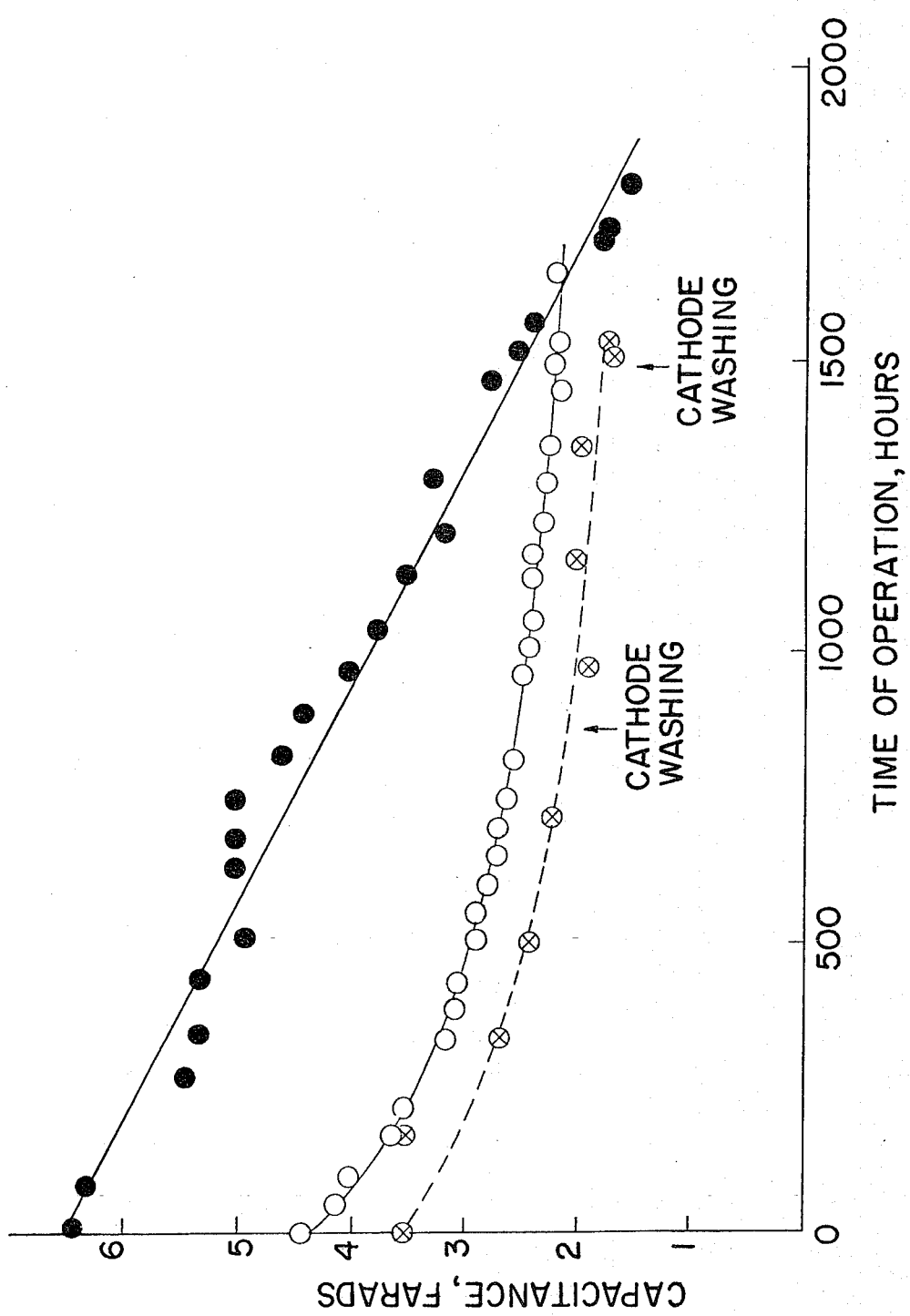

United States Patent [19]

Gestaut et al.

[11] 4,337,139
[45] Jun. 29, 1982

[54] FLUORINATED CARBON ELECTRODE

[75] Inventors: Lawrence J. Gestaut, Painesville, Ohio; Frank Solomon, Great Neck, N.Y.

[73] Assignee: Diamond Shamrock Corporation, Dallas, Tex.

[21] Appl. No.: 202,581

[22] Filed: Oct. 31, 1980

[51] Int. Cl.³ .................. C25B 11/03; C25B 11/04; H01M 4/92
[52] U.S. Cl. ................. 204/292; 204/290 R; 204/294; 429/42; 429/45
[58] Field of Search ............ 429/42, 45; 204/292, 204/294, 290 R

[56] References Cited

U.S. PATENT DOCUMENTS

| | | | |
|---|---|---|---|
| 3,385,780 | 5/1968 | Feng | 204/294 |
| 3,409,472 | 1/1968 | Weber et al. | 429/45 |
| 3,536,532 | 10/1970 | Watanabe et al. | 429/194 |
| 3,935,029 | 1/1976 | Baker et al. | 429/42 |
| 4,135,995 | 1/1979 | Welch | 204/98 |
| 4,187,350 | 2/1980 | McIntyre et al. | 429/45 |
| 4,299,682 | 11/1981 | Oda et al. | 204/265 |

*Primary Examiner*—F. Edmundson
*Attorney, Agent, or Firm*—John P. Hazzard

[57] ABSTRACT

This disclosure is directed to preparing deashed, precious metal catalyst-containing, partially fluorinated active carbon particles of the formula $CF_x$, where x ranges from 0.1 to about 0.18, preferably using either platinum or silver as the catalyzing material, which can be incorporated into an active layer component of a gas electrode, e.g., an oxygen (air) cathode suitable for use in a chlor-alkali electrolytic cell for producing chlorine and caustic while conserving electrical energy. These particles are deashed to have a B.E.T. surface area of at least 600 $m^2/g$ and contain less than about 4 weight percent ash. Active electrode layers containing such particles demonstrate an unusually desirable combination of resistance to corrosion, retention of conductive properties and retention of catalytic surface area.

6 Claims, 2 Drawing Figures

FLUORINATED CARBON ELECTRODE

BACKGROUND OF THE INVENTION

In the field of electrochemistry there is a well-known electrochemical cell known as a chlor-alkali cell. In this cell, an electric current is passed through a saturated brine (sodium chloride salt) solution to produce chlorine gas and caustic soda (sodium hydroxide). A large portion of the chlorine and caustic soda for the chemical and plastics industries are produced in chlor-alkali cells.

Such cells are divided by a separator into anode and cathode compartments. The separator characteristically can be a substantially hydraulically impermeable membrane, e.g., a hydraulically impermeable cation exchange membrane, such as the commercially available NAFION® manufactured by the E. I. du Pont de Nemours and Company. Alternatively, the separator can be a porous diaphragm, e.g., asbestos, which can be in the form of vacuum deposited fibers or asbestos paper sheet as are well known in the art. The anode can be a valve metal, e.g., titanium, provided with a noble metal coating to yield what is known in the art as a dimensionally stable anode.

One of the unwanted byproducts present in a chlor-alkali cell is hydrogen which forms at the cell cathode. This hydrogen increases the power requirement for the overall electrochemical process, and eliminating its formation is one of the desired results in chlor-alkali cell operation.

It has been estimated that 25 percent of the electrical energy required to operate a chlor-alkali cell is utilized due to the formation of hydrogen at the cathode. Hence, the prevention of hydrogen formation, e.g., by reacting water with oxygen at the cathode resulting in the formation of hydroxide, can lead to substantial savings in the cost of electricity required to operate the cell. In fairly recent attempts to achieve cost savings and energy savings in respect of operating chlor-alkali cells, attention has been directed to various forms of what are known as oxygen (air) cathodes. These cathodes prevent the formation of molecular hydrogen at the cathode and instead reduce oxygen to form hydroxyl ions. Savings in cost for electrical energy are thereby achieved.

One known form of oxygen (air) cathode involves use of an active layer containing porous active carbon particles whose activity in promoting the formation of hydroxide may or may not be catalyzed (enhanced) using precious metal catalysts, such as silver, platinum, etc. Unfortunately, however, the pores of such active carbon particles may become flooded with the caustic soda thereby significantly reducing their ability to catalyze the reduction of oxygen at the air cathode and resulting in decreased operating efficiency. In an attempt to overcome these difficulties in flooding of the active carbon, hydrophobic materials, e.g., polytetrafluoroethylene (PTFE), have been employed in particulate or fibrillated (greatly attenuated and elongated) form to impart hydrophobicity to the active carbon layer, per se, and/or to a protective (wetproofing) or backing sheet which can be laminated or otherwise attached to the active layer. Thus, PTFE has been employed in both active layers and in backing (wetproofing) layers secured thereto. Such active carbon-containing layers, however, are subjected to loss of strength resulting in failure combined with blistering thereof when the chlor-alkali cell is operated at high current densities, viz., current densities of about 250 milliamperes/cm$^2$ and higher for prolonged time periods.

In the fuel cell art, the cathode of fuel cells can be made of conducting particles, e.g., conducting particles of carbon, for example, active carbon, viz., carbon having a B.E.T. surface area greater than 600 m$^2$/g. Catalyzed active carbon is a suitable catalyst for the reduction of oxygen to hydroxide at the cathode.

In such cathode active layers, which contain the active carbon catalyst particles, there is encountered a situation whereby the caustic soda (NaOH) wets the catalyst surface and in essence blocks the pores from contacting the reactants and thereby functioning as a catalyst. Additionally, the active carbon particles are corroded when in use, and this corrosion reduces their catalytic efficiency and also their surface area.

Various techniques have been developed in the art to reduce the wettability of the active carbon catalyst particles. One of these techniques involves mixing or otherwise incorporating polytetrafluoroethylene (PTFE) particles with the active carbon particles to impart hydrophobicity to the active carbon layer and lessen or inhibit its disposition to be wetted by the alkali present in the chlor-alkali cell. Since the PTFE particles are less electrically conductive than the active carbon particles, they detract from the overall conductivity of the active layer. Hence, it is difficult to obtain a balance between hydrophobicity, catalyst activity, retention of surface area and reduction in electric power requirement for conducting this electrochemical reaction which takes place in chlor-alkali cells.

The present invention enables the attainment of a very desirable combination of balanced properties in the active layer of an oxygen cathode which is useful in a chlor-alkali cell thereby resulting in savings which accompany prevention of hydrogen production at the cathode in a chlor-alkali cell. It has been observed that the partially fluorinated $CF_x = 0.1$ to about 0.18 active carbon particles, both catalyzed and uncatalyzed, can be used in accordance with this invention when incorporated into the active layer of an oxygen (air) cathode.

PRIOR ART

U.S. Pat. No. 3,385,780 to I-Ming Feng discloses a thin porous electrode which consists of a thin layer of polytetrafluoroethylene pressed against a thin layer of polytetrafluoroethylene containing finely divided platinized carbon wherein the platinum is present in weight concentrations of 1.2 to 0.1 milligrams of platinum per cm$^2$ of catalyst surface. This platinized particulate carbon is present in the electrically conducting face of the thin electrode. Heat decomposable filler materials are utilized in conjunction with the polytetrafluoroethylene and conductive carbon particles to assist in forming the aforementioned composite thin porous electrode. Although the patentee states that the preferred electrically conductive material is finely divided carbon, there is no specific disclosure of active carbon, viz., carbon characterized by B.E.T. surface areas ranging from about 600 to 2000 square meters per gram; in the form of agglomerates or aggregates with particle sizes of 10 to 50 microns; relatively amorphous and of low graphitic character; and an internal pore volume of 70 to 80 percent, e.g., 74 percent, to the particle. There is no mention in U.S. Pat. No. 3,385,780 of fluorination of carbon particles for any purpose, whatsoever.

U.S. Pat. No. 4,135,995 to Cletus N. Welch discloses a cathode having a hydrophillic portion formed of a solid intercalation compound of fluorine and carbon having the emperical formula $CF_x$, where x is between 0.25 and 1.00. "Intercalation compound of carbon and fluorine" is defined to mean a carbonaceous material crystallized in a graphitic layer lattice with the layer atoms being approximately 1.41 angstroms apart, the layers being a great distance apart, e.g., at least about 3.35 angstroms, and with fluorine atoms present between the layers. An alternative definition is given by the patentee wherein intercalation compounds of carbon and fluorine are defined as fluorinated graphites and graphite fluorides characterized by an infrared spectrum showing an absorption band at 1,220 centimeters$^{-1}$. These particulate intercalation compounds can be incorporated into a cathode structure wherein a portion of a current carrier has applied thereto such intercalation compound(s) and another portion thereof has a hydrophobic material, e.g., polyfluoroethylene (PTFE) deposited thereon. The cathode can be employed as an air (oxygen) cathode. Alternatively, the entire particle may be formed of the intercalation compound and a portion thereof may be coated with the hydrophobic material.

The partially fluorinated active carbon particles employed in accordance with the process and to produce the materials and products of this invention are readily distinguishable from the intercalation compounds referred to by the Welch patent in the following significant respects. Firstly, the partially fluorinated carbon compounds of this invention are active carbon particles which have been reacted with fluorine chemically to produce compounds of carbon and fluorine of the formula $CF_x$, wherein x ranges from about 0.1 to about 0.18, and more preferably from about 0.12 to 0.16. Use of $CF_x$ compounds having these extents of fluorination is nowhere contemplated in said Welch patent. Secondly, the intercalation compounds of carbon and fluorine whose use is contemplated by Welch are fluorinated graphite and graphite fluorides whereas the partially fluorinated carbon compounds used in the present invention are amorphous active carbons having a high B.E.T. surface area, e.g., in excess of 600 m$^2$/g, and as such, they are not considered as fluorinated graphites or graphite fluorides within the meaning and context expressed in the Welch patent.

DESCRIPTION OF THE INVENTION

The partially fluorinated active carbon particles employed in accordance with this invention are active carbon particles as defined above having a particle size of less than about 50 microns with a preponderant concentration thereof having a particle size within the range of about 10 to about 20 microns.

The active carbon whose use is contemplated in accordance with this invention encompasses a variety of materials which in general, prior to the partial fluorination, encompass a variety of amorphous carbonaceous materials, generally of vegetable origin which contain inorganic residue, e.g., noncarbonaceous oxides, collectively designed as ash.

In accordance with one preferred embodiment of this invention, the active carbon starting material is "RB" carbon which is a form of active carbon manufactured by Calgon, a division of Merck, and is made from bituminous coal by known procedures. This material can contain as much as approximately 23 percent of various oxides and components which can be collectively designated as ash. Typical analysis of the ash contained in RB carbon is as follows:

| Component | Weight Concentration |
|---|---|
| Silica | 43.34 |
| Alumina ($Al_2O_3$) | 29.11 |
| Iron Oxides ($Fe_2O_3$) | 20.73 |
| Others | 6.82 |

Preferably, the active carbon is deashed. This deashing does not totally remove the ash content from the active carbon but results in a substantial reduction thereof, viz., from about 70 to 80 percent or more of the ash is removed. The deashing procedure is described and claimed in U.S. patent application Ser. No. 202,580, filed of even date herewith in the name of Frank Solomon and entitled "Active Carbon Conditioning Process." The disclosure of this application is incorporated herein by reference.

The initial stage of deashing treatment constitutes contacting the active carbon particles as obtained, e.g., "RB" carbon, as mentioned above, with either an acid or an alkali followed by contact with the other. For example, during the alkali (base) contacting stage, the alkali material, such as sodium hydroxide, potassium hydroxide, etc., is maintained at elevated temperatures ranging from about 90° to about 140° C. and several contacting steps are used over time periods of, e.g., 0.5 to 25 hours, followed by one or more intermittent water washing step(s).

Then the thus treated active carbon is contacted with an acid, such as hydrochloric acid, for similar extended time periods at ambient temperatures. Between the alkali and acid contacting phases, the active carbon particles can optionally be dried. However, drying is not required in accordance with this invention.

Usually, the alkali is employed in the form of an aqueous solution containing from 28 to 55, and more usually from 35 to 45 weight percent alkali based on total solution.

The acid content of the aqueous acid solution customarily ranges from 10 to 30 weight percent and more usually from 15 to 25 weight percent acid based on total solution.

Prior to contact with the alkali solution, it has been found desirable to first classify or comminute, e.g., ball mill or otherwise divide up the active carbon particles as purchased to a particle size of 5 to 20 microns. For example, "RB" active carbon was ball milled for 2 to 6 hours, and more usually approximately 4 hours to reduce its particle size from about 30 to 50 microns to about 5 to 20 microns.

Usually the alkali washing stage is performed in several individual washing steps using a hot (100° to 130° C.) alkali solution. After the alkali washing has been completed, the alkali is neutralized using one or more water washing step(s) to remove the alkali prior to the acid wash stage.

Similarly, the acid washing stage can be accomplished in several discrete washing steps rather than all at one time. Additionally, the contact with acid can be accomplished at lower temperatures for longer periods of time. For example, the acid wash can be conducted overnight (approximately 16 hours) at room temperature. As with the alkali contact stage preferably after the acid contact, the active carbon particles are subjected to a water washing to remove the acid followed by drying. Alternatively, the acid stage can be conducted at elevated temperatures using a Soxhlet extraction constant reflux apparatus, e.g., using HCl, HBr, etc., at 110° to 130° C. for about 0.5 hr., viz., constant boiling mineral acids, each having its respective boiling range. While many acids may suitably be employed, the acid of choice is hydrochloric acid.

The sequential deashing pretreatment results in substantial reduction of the aforementioned ash content of the active carbon particles. Typically, when utilizing active carbon having an initial B.E.T. surface area of 600 to 1500 m$^2$/g (square meters per gram) and pretreating it with alkali and acid, reductions of ash content from about 12 weight percent to not more than about 4 weight percent accompanied by increases in B.E.T. surface area of up to 50 percent have been accomplished.

The active carbon particles (preferably deashed) within the above particle size range and surface area are contacted with fluorine, viz., $F_2$, usually in a fluidized bed where the active carbon particles comprise the particulate bed material and wherein the fluidizing gas is $F_2$ in argon wherein the $F_2$ concentration ranges from about 0.5 to 5.0 weight percent, based on $F_2$ plus argon. The fluidization can be conducted at temperatures ranging from about 100° C. to 350° C. over time periods ranging from about 5 to about 60 minutes to produce the $CF_x$ compounds, where x ranges from about 0.1 to about 0.18. The extent of fluorination of the $CF_x = 0.1$ to 0.18 material can be determined in accordance with known analytical procedures. For example, the sample can be subjected to combustion and then either titrated with thorium nitrate in the presence of an indicator, or a fluoride-sensitive electrode can be used.

The partially fluorinated active carbon particles having the abovedescribed particle size range and porosity characteristics can then be catalyzed, viz., contacted with a precious metal precursor material which is then chemically or otherwise reduced resulting in deposition of a precious metal on and/or within the pores thereof, such as platinum, etc., or any of the catalytic materials disclosed at column 7 of the Welch U.S. Pat. No. 4,135,995.

In accordance with a preferred embodiment of this invention, when the deposited catalytic material is platinum, it is deposited in accordance with the method set forth in U.S. Pat. No. 4,044,193. This procedure essentially involves deposition of $H_3Pt(SO_3)_2OH$ on the partially fluorinated active carbon particles followed by reduction using hydrogen peroxide or hydrazine.

The catalyzed or uncatalyzed, partially fluorinated, deashed active carbon particles can then be "Teflonated," viz., provided with a discontinuous, adherent coating of smaller polytetrafluoroethylene particles around the larger active carbon particles. This discontinuous coating is obtained by adding a dilute dispersion containing particulate polytetrafluoroethylene (PTFE), e.g., du Pont "Teflon 30" having a particle size of about from 0.05 to about 0.5 micron in water to an aqueous mix of the active particles and water in a weight ratio of from about 15 to 35 weight parts of PTFE to from about 65 to about 85 weight parts of active carbon. The thus "Teflonated" active carbon particles were then filtered and dried by heating at about 100° to 140° C.

If desired, the PTFE wetting agent can be removed by extracting with chloroform in the manner described and claimed in U.S. patent application Ser. No. 202,584, filed Oct. 31, 1980 in the name of Frank Solomon of even date herewith and entitled "Extraction Treatment." The disclosure of this application is incorporated herein by reference.

The "Teflonated," partially fluorinated active carbon particles can then be combined with a particulate, subsequently removable (fugitive) pore-forming agent prior to formation into an active layer sheet for use in an electrode. The pore-former can be a soluble one, e.g., sodium carbonate, or a volatile agent, e.g., ammonium benzoate. Alternatively, the particulate pore-former can be initially combined with an intimate mix of carbon black and particulate polytetrafluoroethylene and this mix then combined with the "Teflonated" partially fluorinated active carbon.

Resistivity measurements on the partially fluorinated active carbon particles $CF_x$, where x=0.1 to about 0.18, utilized according to this invention reveal that as the degree of fluorination substantially exceeds about 0.2, the resistivity increases dramatically causing such materials to be unsuitable for use in this invention.

The invention will be illustrated further in the examples which follow in which all parts, percents and ratios are by weight, unless otherwise indicated.

EXAMPLE 1

Commercially available ball milled "RB carbon" was found to have an ash content of approximately 12 percent as received. This "RB carbon" was deashed by treating it in 38 percent KOH for 16 hours at 115° C. and found to contain 5.6 percent ash content after a subsequent furnace operation. The alkali-treated "RB carbon" was then treated (immersed) for 16 hours at room temperature in 1:1 aqueous hydrochloric acid (20 percent concentration). The active carbon was finally washed with water until relatively acid free, the pH of the wash water being approximately 3.5. The active carbon was then dried at 110° C. overnight. The resulting ash content had been reduced to 2.8 percent.

Resistivity measurements were taken under compaction pressure of 500 psi on "RB" active carbon (without deashing), and four deashed "RB" active carbon which were partially fluorinated to the extents indicated below, viz., where x=0.15, 0.15, 0.34 and 0.44, respectively. These carbons were fluorinated by MarChem, Inc. of Houston, Tex., and were assigned the designations of $RBF_{0.14}$, $RBF_{0.15}$, $RBF_{0.34}$ and $RBF_{0.44}$, respectively. The resistivity values obtained for each are tabulated below.

TABLE 1

| Active Carbon | RB | $RBF_{0.14}$ | $RBF_{0.15}$ | $RBF_{0.34}$ | $RBF_{0.44}$ |
|---|---|---|---|---|---|
| Resistivity (ohm centimeters) | 0.36 | 1.00 | 1.26 | 22.2 | Immeasurably High |

EXAMPLE 2

The deashed active carbon $RBF_{0.14}$ was then provided with platinum catalyst generally in accordance with the method set forth in U.S. Pat. No. 4,044,193. Specifically, 9 grams of deashed $RBF_{0.14}$ were slurried in 150 mls of water and 5 mls of $H_3Pt(SO_3)_2OH$ (200 g Pt per liter of solution) were added thereto. The pH was adjusted to 3 with 1 N NaOH aqueous solution and 12 mls of 35 percent hydrogen peroxide were added. After stirring for an hour, the pH was readjusted to 3 with 1

N NaOH and the solution was heated to 80° C. until all bubbling stopped. The thus platinized active carbon was then filtered and dried at 140° C. The resulting product had 10 percent Pt.

The thus platinized $RBF_{0.14}$ was "Teflonated" to a 20 percent level (20 percent PTFE, 80 percent $RBF_{0.14}$) using "Teflon 30" in the manner previously set forth. Then "Shawinigan Black" (a commercially available acetylene carbon black) was "Teflonated" to a 30 percent level using "Teflon 30" and mixed with 1 to 4 micron classified sodium carbonate (pore-former).

Two and one-half parts of the "Teflonated" $RBF_{0.14}$ and one part of the "Teflonated" carbon black-sodium carbonate were then mixed and the mixture was rolled into a thin active layer sheet approximately 0.020 inch (20 mils) thick by passing it between six-inch diameter chrome-plated steel rollers heated to a temperature of about 80° C.

A PTFE wetproofing (backing) layer was prepared as follows:

Two hundred cubic centimeters of isopropyl alcohol were poured into an "Osterizer" blender. Then 49 grams of du Pont 6A polytetrafluoroethylene were placed in the blender and the PTFE/alcohol dispersion was blended at the "blend" position for approximately one minute. The resulting slurry had a thick, pasty consistency. Then another 100 cc of isopropyl alcohol were added in the blender, and the mixture was blended (again at the "blend" position) for an additional two minutes.

Then 91 grams of particulate sodium carbonate in isopropanol (ball milled and having an average particle size of approximately 3.5 microns as determined by a Fisher Sub Sieve Sizer) were added to the blender. This PTFE/sodium carbonate mixture was then blended at the "blend" position in the "Osterizer" blender for three minutes followed by a higher speed blending at the "liquefying" position for an additional one minute. The resulting PTFE/sodium carbonate slurry was then poured from the blender onto a Buchner funnel and filtered and then placed in an oven at 80° C. where it was dried for three hours resulting in 136.2 grams yield of PTFE/sodium carbonte mixture. This mixture contained approximately 35 weight parts of PTFE and 65 weight parts of sodium carbonate.

This mixture was then mildly fibrillated in a Brabender Prep Center with attached Sigma mixer. After fibrillating, which compresses and greatly attenuates the PTFE, the fibrillated material is chopped to a fine, dry powder using a coffee blender, i.e., Type Varco, Inc. Model 228.1.00, made in France. Chopping to the desired extent takes from about 5 to 10 seconds because the mix is friable. The extent of chopping can be varied as long as the material is finely chopped.

The chopped PTFE-$Na_2CO_3$ mix is fed to 6-inch diameter chromeplated steel rolls heated to about 80° C. Typically, these rolls are set at a gap of 0.008 inch (8 mils) for this operation. The sheets are formed directly in one pass and are ready for use as backing layer in forming electrodes, e.g., oxygen cathodes, with no further processing beyond cutting, trimming to size and the like. Such PTFE backing layers are described and claimed in U.S. patent application Ser. No. 202,583, filed in the name of Frank Solomon and Charles Grun of even date herewith and entitled "One Pass Process for Forming Electrode Backing Sheet." The disclosure of this copending application is incorporated herein by reference.

An oxygen (air) electrode was then made from the rolled active layer sheet by laminating one side (the working surface) thereof to a 58×60×0.004 inch woven silver-plated nickel wire mesh current distributor having a 0.0003-inch thick silver plating, and on its other side to the PTFE wetproofing layer described herein at 8 tons/in² pressure and 110° C. in a hydraulic press for approximately 3 minutes.

The PTFE backing layer made as described above, when washed free of sodium carbonate, is characterized as porous, self-sustaining, coherent, unsintered, uniaxially oriented backing (wetproofing) layers of fibrillated polytetrafluoroethylene having pore openings of about 0.1 to 40 microns (depending on the size of the pore former used).

This laminated electrode was tested in 30 percent aqueous NaOH at 70° C. with carbon dioxide-free air, viz., air having the $CO_2$ removed, supplied at 4 times the theoretical air requirement (for an oxygen cathode in a chlor-alkali cell) under a current density of 300 ma/cm². Over a 1080-hour test period of operation, the potentials ranged form 0.68 to 0.55 volt versus the reversible hydrogen electrode.

EXAMPLE 3

Three laminated electrodes were formed using the PTFE backing layer and silver-plated nickel woven wire mesh as in Example 2 but using three different active layers and tested in accordance with known procedures to determine double layer capacitance (Farads) at 85° C. in nine (9) molar NaOH with oxygen provided over varying extended time periods as reflecting loss of surface area (indicating loss of activity) after varying periods of operation (hours). FIG. 1 of the drawings is a graph plotting capacitance versus hours of operation for these three laminated electrodes.

One active layer (Curve 1 as indicated by solid circles in FIG. 1) contains 75 percent platinized deashed RB active carbon particles and 25 percent particulate PTFE, having approximately 1.1 mg Pt/cm² of said active carbon.

The second active layer (Curve 2 as indicated by open circles on FIG. 1) contains 71 percent of a mixture of 80 percent platinized, deashed RB carbon partially fluorinated to the extent where $x=0.14$, viz., deashed $RBF_{0.14}$, and 29 percent of a carbon black matrix containing 70 percent Shawinigan Black and 30 percent particulate PTFE, wherein the platinized $RBF_{0.14}$ contains 1.5 mg Pt/cm² of said partially fluorinated active carbon.

The third active layer (Curve 3 as indicated by circles with an "x") contains 80 percent of an approximately equal mixture of uncatalyzed $RBF_{0.14}$ and uncatalyzed $RBF_{0.15}$ and 20 percent particulate PTFE.

As will be noted from FIG. 1, both partially fluorinated materials (Curves 2 and 3) show a more constant rate of surface loss or activity decline after extended periods of operation establishing an exponential or asymptotic relationship of decline versus the straight line decline observed with the unfluorinated material of Curve 1. In short, the $CF_x=0.1$ to 0.18 partially fluorinated active carbons yield electrode active layers which last longer in operation compared with their active carbon counterparts having no fluorination. Basically, this is the case whether said $CF_x=0.1$ to 0.18 active carbons are catalyzed or uncatalyzed.

EXAMPLE 4

Two laminated test electrodes were made in accordance with the method of Example 2 using the same PTFE backing layer and silver-plated nickel woven wire mesh current distributor as in Example 2. These laminates were then tested for performance in nine (9) molar NaOH with oxygen available wherein the current density (milliamperes/cm$^2$) was varied up to 1000 ma/cm$^2$ to note the potential (volts), as compared with a standard Reversible Hydrogen Electrode (RHE), at varying current densities.

Figure 2:
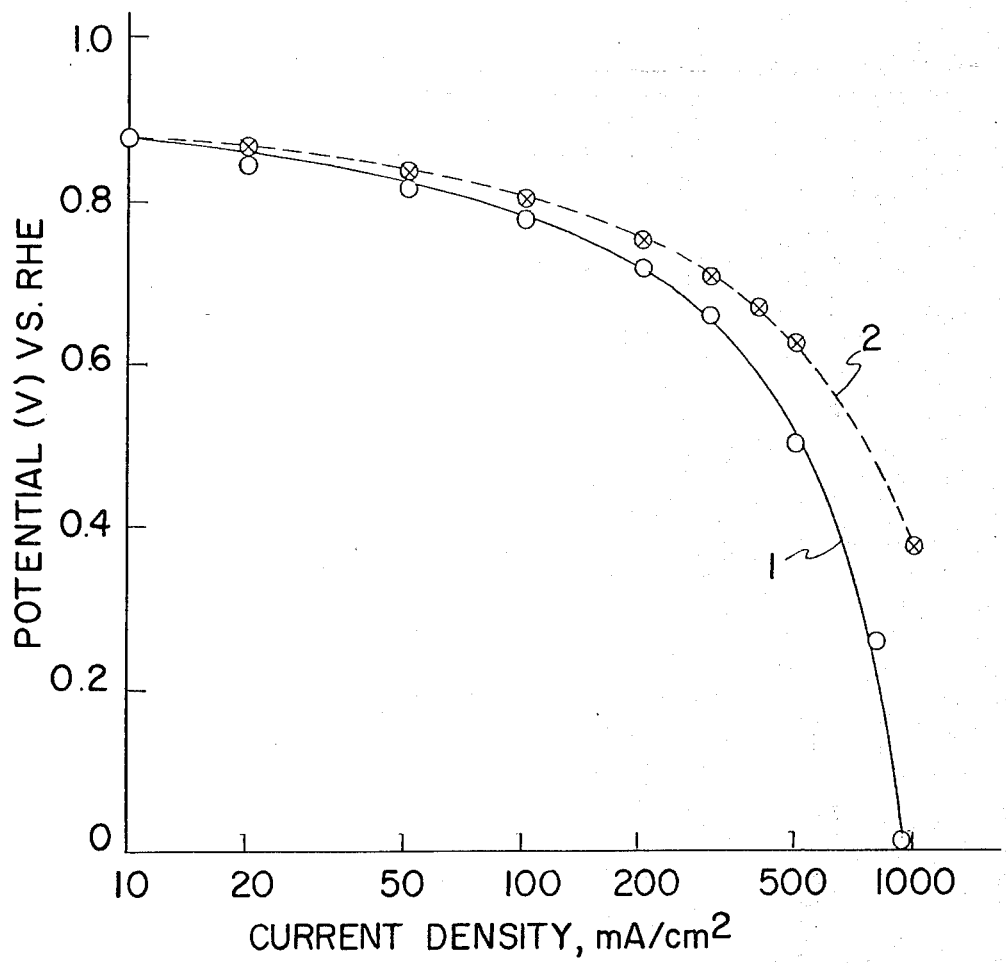

The laminated electrode of the FIG. 2 Curve 1 (solid circles) had an active layer containing 75 percent deashed RB active carbon and 25 percent PTFE whereas that of the FIG. 2 Curve 2 (open circles with an "x") had 80 percent of substantially an equal mixture by weight of deashed RBF$_{0.14}$ and RBF$_{0.15}$ partially fluorinated active carbons and 20 percent PTFE.

Neither active carbon was catalyzed, nor did either contain a carbon black matrix.

As will be observed from FIG. 2 (plotting current density versus potential), the laminated electrode whose active layer contained the RBF$_x$=0.1 to 0.18 was superior in performance to that containing RB active carbon, per se, particularly at the more demanding, viz., higher current densities.

What is claimed is:

1. Partially fluorinated active carbon particles of the formula CF$_x$, where x=from 0.1 to about 0.18 having an ash content of less than about 4 weight percent, a B.E.T. surface area of at least 600 m$^2$/g and containing precious metal catalyst.

2. Partially fluorinated active carbon particles as in claim 1 wherein said precious metal is platinum.

3. Partially fluorinated active carbon particles as in claim 1 wherein said precious metal is silver.

4. Partially fluorinated active carbon particles as in claim 1 having a discontinuous coating of smaller adherent particles of polytetrafluoroethylene.

5. An electrode active layer containing partially fluorinated active carbon particles of the formula CF$_x$, where x=from 0.1 to about 0.18.

6. An electrode active layer containing partially fluorinated active carbon particles of the formula CF$_x$, where x=from 0.1 to about 0.18 having an ash content of less than about 4 weight percent and a B.E.T. surface area of at least 600 m$^2$/g, said partially fluorinated active carbon particles being mixed with carbon black, particulate polytetrafluoroethylene, and a pore former.

* * * * *